United States Patent
Biswas et al.

(10) Patent No.: US 10,922,859 B2
(45) Date of Patent: Feb. 16, 2021

(54) VECTOR ART OBJECT DEFORMATION TECHNIQUES

(71) Applicant: Adobe Inc., San Jose, CA (US)

(72) Inventors: Sanjeev Kumar Biswas, Bangalore (IN); Ankit Aggarwal, Faridabad (IN); Rajeev Kumar, Nawada (IN); Sunny Ladkani, Noida (IN)

(73) Assignee: Adobe Inc., San Jose, CA (US)

( * ) Notice: Subject to any disclaimer, the term of this patent is extended or adjusted under 35 U.S.C. 154(b) by 94 days.

(21) Appl. No.: 16/160,914

(22) Filed: Oct. 15, 2018

(65) Prior Publication Data

US 2020/0118309 A1 Apr. 16, 2020

(51) Int. Cl.
| | |
|---|---|
| *G06T 11/20* | (2006.01) |
| *G06F 3/0484* | (2013.01) |
| *G06T 11/60* | (2006.01) |
| *G06T 17/00* | (2006.01) |
| *G06T 19/20* | (2011.01) |

(52) U.S. Cl.
CPC ........ *G06T 11/203* (2013.01); *G06F 3/04845* (2013.01); *G06T 11/60* (2013.01); *G06T 17/005* (2013.01); *G06T 19/20* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 6,856,312 B1* | 2/2005 | Imai | G06T 17/30 345/419 |
| 2004/0002660 A1* | 1/2004 | Mielekamp | G06T 17/00 600/508 |
| 2007/0182762 A1* | 8/2007 | Wu | G06T 3/0093 345/647 |
| 2013/0194263 A1* | 8/2013 | Sakurai | G06T 17/05 345/420 |
| 2014/0146039 A1* | 5/2014 | Duplessis | G06F 3/04845 345/419 |
| 2016/0379405 A1* | 12/2016 | Baca | H04N 13/271 463/32 |
| 2017/0294043 A1* | 10/2017 | Yoo | G06T 17/005 |

* cited by examiner

*Primary Examiner* — Jeffrey J Chow
(74) *Attorney, Agent, or Firm* — Fig. 1 Patents

(57) ABSTRACT

Vector art object deformation techniques applied to digital images by vector art rendering system of a computing device are described. The vector art rendering system is configured to deform vector art objects associated with anchor points within a digital image based solely on the movement of the anchor points. Moreover, the vector art rendering system is also configured to adjust anchor points associated with vector art objects within a digital image based solely on the movement of the vector art objects. Techniques are also described that facilitate the automatic association of path segment and vector art objects to anchor points that possess multiple preexisting vector art object associations.

20 Claims, 16 Drawing Sheets
(10 of 16 Drawing Sheet(s) Filed in Color)

VECTOR ART OBJECT DEFORMATION TECHNIQUES

BACKGROUND

Vector art rendering systems as executed by a computing device include a variety of graphics design and editing features to create digital content including digital images, vector graphics, and so forth. These features are presented in visual guides and panels with which content creators interact, e.g. via a user interface. These panels include a variety of drawings, selection, and painting tools that enable content creators to generate digital content with intricate configurations. In particular, content creators use the drawings tools to draw path segments, shapes, and path objects, and combine one or more of these at select points to create intricately designed content. Creators also use selection tools to choose and group items, in addition to controlling their alignment and spacing, Painting tools are used to apply colors and color gradients to one or more of these items.

While conventional vector art rendering systems allow content creators to combine path segments, points, and shapes, the tools as implemented by these conventional systems have numerous limitations. In one example, anchor points and lines are used by the system to generate and connect path segments to each other in order to create complex shapes. An anchor point is a feature in graphics design and editing tools that includes an in-bound handle and an out-bound handle—lines that extend outward from the point in diametrically opposite directions. Content creators may interact with these lines, via a user interface of the system, to control the curvature (e.g. degree of bend) of vector art objects connected to these lines. In some instances, however, a content creator may desire to connect a complex shape or a path segment to an anchor point that is already associated with two path segments or curve segments. Conventional techniques that support use of anchor points and lines as implemented by conventional vector art rendering systems, however, do not support such a connection.

In conventional vector art rendering systems, anchor points include an in-bound handle and an out-hound handle, which appear automatically upon the creation of the anchor point. Conventional techniques only permit the in-bound and out-bound-handles of anchor points to be connected to a single respective line or curve segment. As a result, only two lines segments or curve segments may be associated with a single anchor point at any one time. As a result, in conventional techniques, anchor points serve as a converging point for at most two line or arc segments, thereby restricting content creators to a narrow set of design choices. Additionally, conventional techniques altogether fail to allow content creators to connect a complex path object or a complex shape, e.g., sphere, circle, rectangle, etc., to an anchor point. As such, the ability of content creators to design intricate configurations of digital content using conventional vector art rendering systems is restricted, primarily because the universe of vector art objects that can be combined together using conventional vector art rendering systems is limited.

Conventional techniques as implemented by conventional vector art rendering systems also limit the ability of content creators to control, via a computing device, movement of path segments and shapes such that the integrity of the digital content is maintained, in particular, if a path segment is moved in conventional techniques from one location to another, the path segment loses its connection with the anchor point. Likewise, movement of an anchor point in conventional techniques causes the anchor point to sever its connection with the path segment to which it is connected. As such, editing and creating digital content with complex configurations with the use of conventional techniques and systems becomes cumbersome and inefficient.

Subsequent techniques have been developed in an attempt to mitigate this problem, e.g. through use of a "join" command, which enables a content creator, through interaction with a computing device, to move path segments or anchor points without severing existing connections. Such techniques, however, require content creators to perform an additional step of manually selecting each of the path segments that converge at a given anchor point and clicking the join command, which results in a tedious and ineffective design process. Only after the computing device performs the additional step can existing connections be maintained. Conventional techniques and systems that employ some version of the "join" command contain several disadvantages in that these commands do now allow the joining of complex shapes and complex path objects, e.g., circle, sphere, rectangle etc., with path segments, or other complex shapes. Additionally, conventional techniques do not enable content creators, through interaction with the conventional vector art rendering systems, to connect complex shapes, complex path objects, or path segments to anchor points with a certain number of preexisting connections.

Consequently, the limitations in conventional techniques restrict user creativity by requiring content creators to manually approximate the extent to which path segments, curves, and other such shapes need to be adjusted after one or more existing connections are severed. As a result, graphic design inefficiencies through interaction with the user interface as well as computational inefficiencies caused by a multitude of operations that are to be performed to overcome these challenges persist.

SUMMARY

Vector art object deformation techniques are described that are configured to, via a computing device, facilitate efficient creation and editing of digital content, while maintaining the original shape constraints and integrity of the digital content. A vector art rendering system as implemented by the computing device described herein is configured to first receive a vector graph of a digital image. The vector graph is a data structure that stores location data in anchor nodes and leaf nodes. The anchor and leaf nodes define and track the location data of anchor points and vector art objects, respectively. Vector art objects may be configured in a variety of ways, including a combination of a bezier curve, path segment, complex shape, or an object with a complex path. In one example, the vector art rendering system receives a user input specifying movement of an anchor point from a first location to a second location within a user interface. The system then determines a displacement value of the anchor point based on the movement to the second location and identifies a vector art object associated with the anchor point based on the location data stored in the associated anchor and a leaf nodes in a vector graph.

Next, the vector art rendering system determines a deformation value of the vector art object based on the anchor point's displacement value and deforms the vector art object based on the determined deformation value. Finally, the vector art rendering system renders and outputs the digital image in the user interface with the anchor point at the moved location and the deformed vector art object at a new location based on the deformation value. All connections within the digital content are maintained subsequent to anchor point movement and the resulting vector art object deformation, and as a result, overcomes the above limitations in conventional vector art rendering systems.

In another example, the vector art rendering system receives a user input that specifies movement of the vector art object from a first location to a second location. In response, the vector art rendering system identifies an anchor point that corresponds to the vector art object, based on the location data of the anchor node and leaf node in a vector graph, each of which, as stated above, defines and tracks the anchor point and vector art object locations. Thereafter, the vector art rendering system determines an adjustment value of the anchor point based on the displacement value of the vector art object and adjusts the anchor point based on the adjustment value. The digital image is then output in the user interface with the vector art object at the second location and the anchor point at a location based on the adjustment. Each of the existing connections within the digital content may be maintained subsequent to vector art object movement and the resulting anchor point adjustment, and as a result this example also overcomes the above limitations of conventional vector art rendering systems.

In this way, the vector art rendering system described herein overcomes the limitations of conventional vector art rendering systems, namely the inability of these systems to maintain connections between vector art objects and anchor points in digital images in the instances where either an anchor point or the vector art objects connected to these points are moved. In contrast, the vector art rendering system described herein is configured to accept user inputs to move anchor points, vector art objects, or both while simultaneously maintaining all connections within a digital image. As a result, the vector art rendering system enables content creators to efficiently create complex configurations without manually scaling, readjusting, and reconnecting one or more of the severed connections. Another advantage of the vector art rendering system is that it enables content creators to, via interacting with the vector art rendering system, connect multiple complex shapes with one another, and one or more path segments with complex shapes, thereby providing a versatility of design choices. Such features are absent in conventional vector art rendering systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawings(s) will be provided by the Office upon request and payment of the necessary fee. The detailed description is described with reference to the accompanying figures. Entities represented in the figures may be indicative of one or more entities and thus reference may be made interchangeably to single or plural forms of the entities in this discussion.

DETAILED DESCRIPTION

Overview

Figure 1:
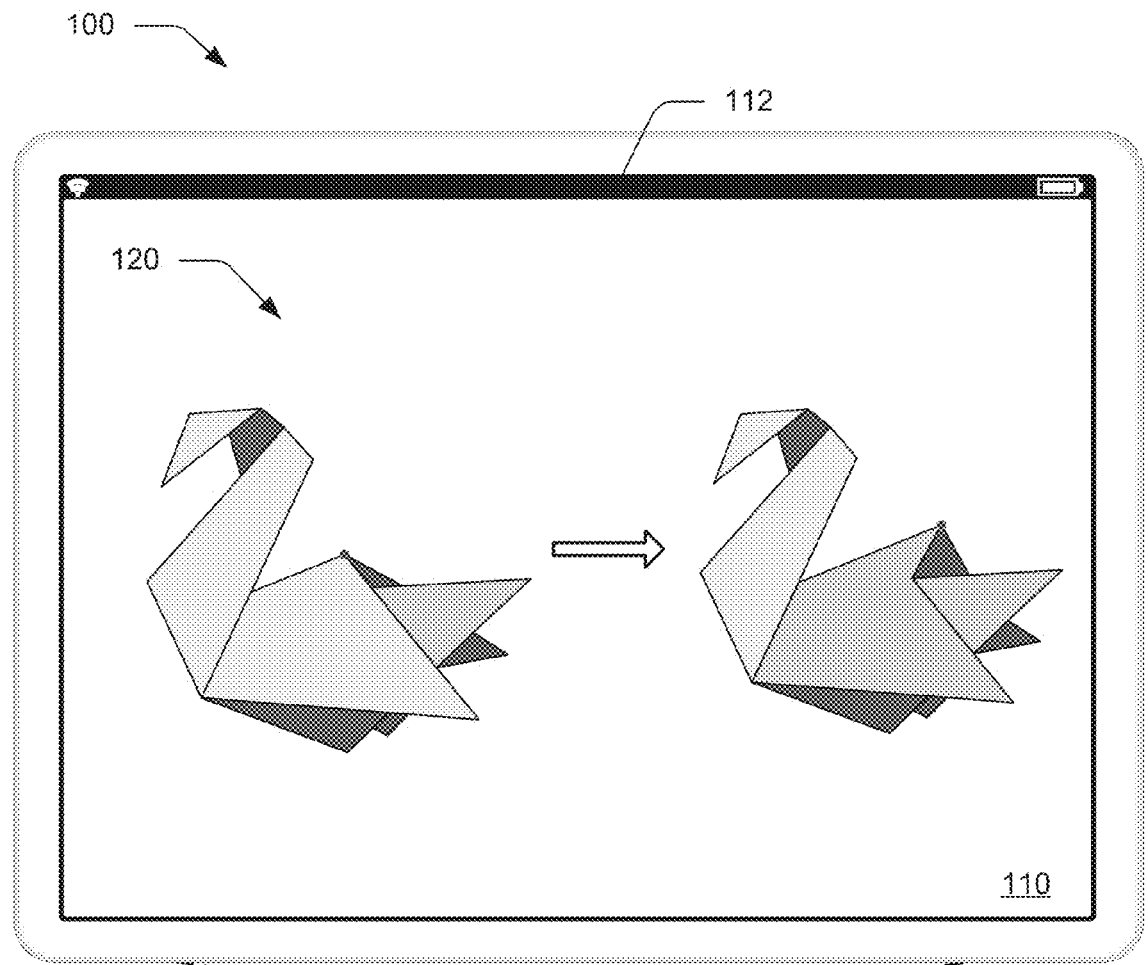
FIG. 1 is an illustration of a vector art rendering system that is operable to enable creation and editing of digital content including moving an anchor point and deforming the vector art object connected to the anchor point without severing the connection between the anchor point and the vector art object.
Figure 1:
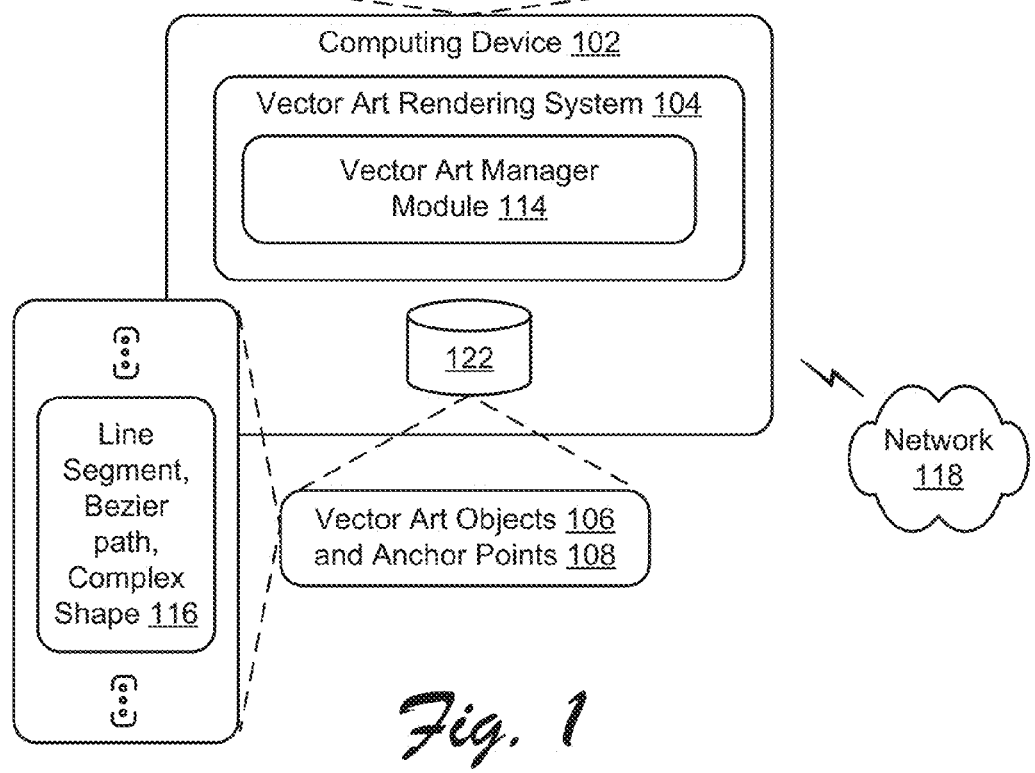

One of the challenges in creating and editing vector art using conventional vector art rendering systems is efficiently managing the spacing and alignment of anchor points, and of vector art objects connected to these points. Conventional vector art rendering systems that are configured to modify vector art through use of a user input to move anchor points or vector art objects result in a severance of the connection between the anchor point and any connected vector art objects. As such, a content creator is forced to manually scale and realign the art object with the anchor point, via a computing device, to reestablish the connection, in many cases requiring the performance of an additional step— execution of a "join" command. Conventional tools also do not allow content creators to connect a path segment or a complex shape to an anchor point that has both the in-bound handle and out-bound handle connected to path segments or arcs. Finally, conventional vector art rendering systems also fail to enable content creators to connect certain types of vector art objects with each other, e.g. complex path shapes. Because of these challenges, conventional vector art rendering systems result in inefficient user of computational resources and well as hinder user interaction.

Accordingly, a vector art rendering system is described that is configured to support vector art position adjustment techniques including movement in anchor point locations, while maintaining all of the anchor point's existing vector art object connections. In one example, a node position module of the vector art rendering system described herein receives a vector graph of a digital image that includes an anchor point and of a vector art object. A movement tracking module then receives a user input specifying movement of the anchor point from a first location to a second location. Based on this movement, a displacement determination module determines a displacement value of the anchor point and a node identification module identifies a vector art object that is connected to the moved anchor point.

With this information, the deformation determination module determines a deformation value of the vector art object, and deforms the object connected to the anchor point based on the deformation value. A digital image output module then outputs the digital image in a user interface with the anchor point at the moved location and the vector art object connected to the anchor point at a location based on the art object's deformation. The connections between the anchor point and the vector art objects are maintained after displacement of the anchor point. Additionally, the location data of the anchor point and the vector art object, stored in the anchor node and leaf node respectively, are both automatically updated by the vector art rendering system after the anchor point's movement.

In this way, the vector art rendering system described herein is configured to receive inputs from content creators that enable the efficient creation of digital content while maintaining existing connections in the digital image. As stated, an advantage of the system is that, unlike conventional digital editing tools, content creators are not forced to manually scale and realign connections severed by the movement of one or more vector art objects or anchor points, which reduces graphic design inefficiencies. Another advantage is that the rendering system is further configured to receive inputs that automatically connects or join objects that simply could not be connected using conventional design tools, namely connecting certain types of vector art objects with each other or connecting a vector art object with an anchor point that has its in-bound handle and out-bound handle already connected to vector art objects.

In essence, the vector art rendering system described herein facilitates adjustment and deformation of one or more distinct components within a digital image while preserving the original constraints and overall integrity of the shapes in image. Another advantage is that the change in the location of the vector art objects and anchor points is stored and updated by a node position module as part of a data structure. In this way, the vector art rendering system provides users with the flexibility to create digital content consisting of connections between complex configurations of vector art and effectively track their movements—features absent from conventional techniques.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of digital medium vector art rendering environment 100 in which the vector art object deformation techniques described herein are employed. The illustrated environment includes a computing device 102, which can be configured in a variety of ways.

The computing device 102, for instance, may be configured as a desktop computer, a laptop computer, a mobile device, e.g. assuming a handheld configuration such as a tablet or mobile phone as illustrated, and so forth. Thus, the computing device 102 may range from full resource devices with substantial memory and processor resources (e.g. personal computers, game consoles) to a low-resource device with limited memory and/or processing resources (e.g. mobile device). Additionally, computing device 102 is representative of a single computing device or a plurality of different devices, such as multiple servers utilized by a business to perform operations "over the cloud" as described in FIG. 15.

The computing device 102 is illustrated as including a vector art rendering system 104. The vector art rendering system 104 is implemented at least partially in the hardware of the computing device 102 to enable creation, editing, and deformation of vector objects 106 while maintaining the connections between these objects and anchor points 108. The vector art objects 106 that are edited and deformed are accessible via user interface 110, e.g. by a display device 112 and/or stored in storage device 122. Although illustrated as implemented locally at the computing device 102, functionality of the vector art rendering system 104 may also be implemented in whole or in part through the functionality available via, network 118, such as part of a web service or "in the cloud."

Vector art objects 106 and anchor points 108 are features of vector graphics used to create digital images and output these images onto display device 112. Vector art rendering system 104 is a vector graphics editor configured to facilitate the efficient editing, deformation, and adjustment of components within vector graphics—namely vector art objects 106 and anchor points 108. Vector Graphics are designed with the use of mathematical equations and geometric primitives, e.g. points, lines, and various shapes. Vector graphics varies from other types of image formats, e.g. raster (or bitmap) images, in that when vector graphics are scaled, the resolution and quality of these images remains sharp. In short, vector graphics enable creation of digital images that can be scaled, adjusted, and edited without suffering a reduction in resolution quality. Vector graphics may be defined using a variety of standards, examples of which include Scalable Vector Graphics (SVG), Portable Document Format (PDF), Encapsulated PostScript (EPS), Windows Metafile (WMF), Vector Markup Language (VML), and so forth.

One of the challenges of conventional vector art rendering systems is that moving anchor points 108 or vector art objects 106 associated with anchor points 108 results in severance of the connection between the anchor points and the vector art objects. As such, users must manually scale, realign, and reestablish each severed connection, making the design process cumbersome and inefficient. Accordingly, the vector art rendering system 104 described herein addresses these and other challenges with the use of a vector art manager module 114. The vector art manager module 114 is configured to track the movement of anchor points 108 and deform one or more vector art objects 106 associated these anchor points based on the tracked movement, and vice versa.

Figure 2:
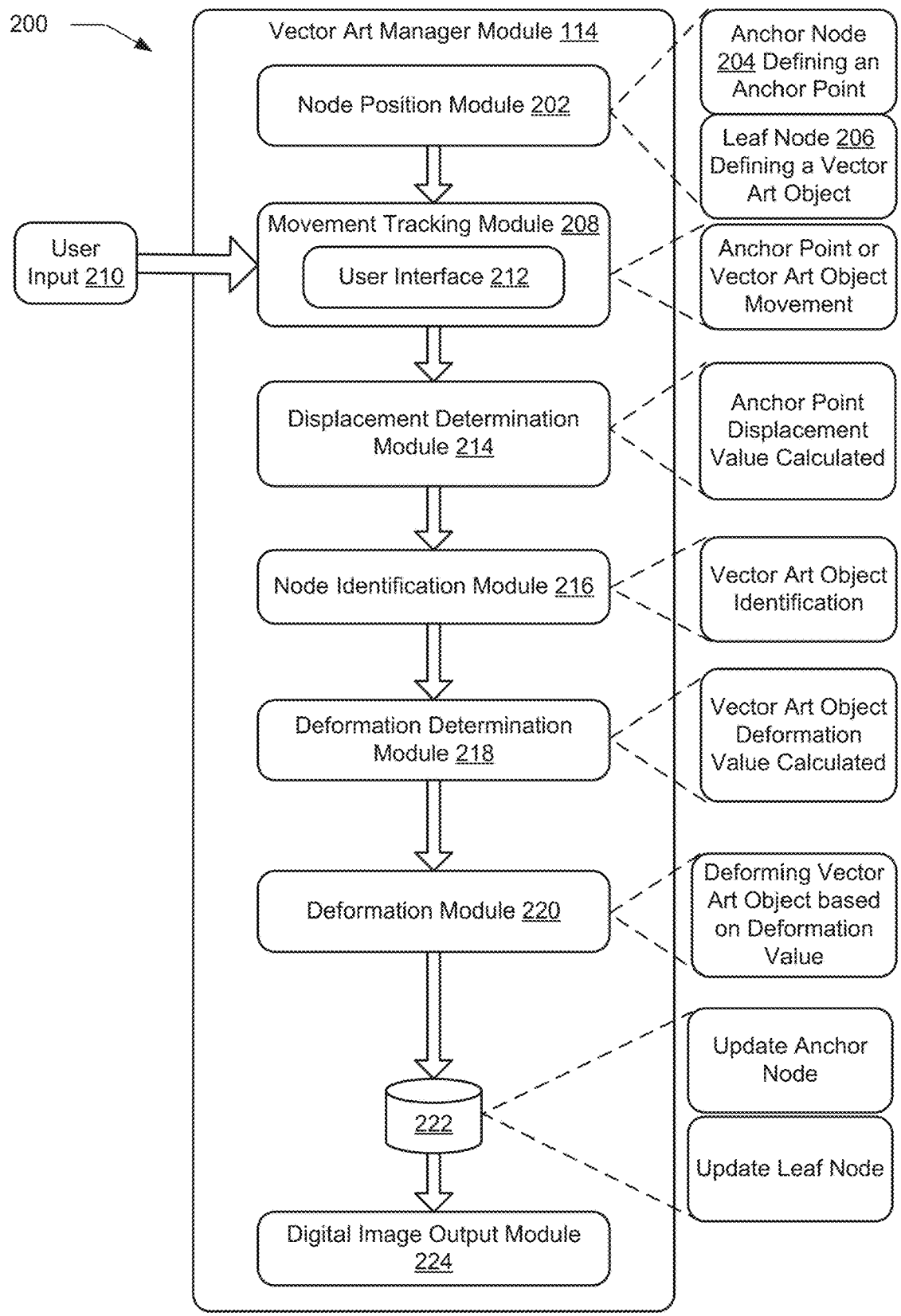
FIG. 2 depicts an example implementation of a vector art rendering system that includes a node position module, movement tracking module, displacement determination module, node identification module, deformation determination module, deformation determination module, adjustment module, and digital image output module in greater detail to support vector art object deformation techniques.

Specifically, as illustrated in an example system of FIG. 2, vector art manager module 114 includes a node position module 202 that receives a vector graph of a digital image. The vector graph includes an anchor node that defines an anchor point and a leaf node that defines at least a vector art object. The vector graph is a data structure that tracks and updates the relationships between the anchor nodes and leaf nodes and updates these relationships when vector art objects are edited, and/or connected to or detached from anchor points. Vector art manager module 114 includes a movement tracking module 208 configured to receive user input 210, specifying movement of an anchor point from a first position to a second position. From user input 210, a displacement determination module 214 determines a displacement value of the anchor point, and a node identification module 216 identifies a vector art object associated with the moved anchor point. Once the vector art object is identified, deformation determination module 218 calculates a vector art deformation value based on the displacement value of the anchor point. Thereafter, a deformation module 220 deforms the vector art object according to the calculated deformation value. Finally, digital image output module 224 outputs the digital image with the anchor point at the second position and vector art object at a location based on the deformation. The anchor node and leaf node values stored in the vector graph are updated after anchor point movement and vector art object deformation.

In another example, the movement tracking module 208 is configured to receive user input 210 specifying movement of a vector object from a first location to a second location. From this, the displacement determination module 214 determines a displacement value of the vector art object and a node identification module 216 identifies one or more anchor points associated with the moved vector art object. Once the one or more anchor points are identified, deformation determination module 218 determines an adjustment value of the anchor points based on the vector art object displacement value and adjusts the points in accordance with the adjustment value. Finally, digital image output module 224 outputs the digital image with the vector art object at the second location and the one or more anchor points at locations based on their adjustment.

In both of the above examples, connections between anchor points and vector art objects are maintained before and after the specified user movements. In this way, the vector art manager module 114 described herein facilitates the adjustment and deformation of anchor points and its associated vector art objects within a digital image without severing existing connections. As such, the original constraints and overall integrity of the vector graphics within digital images are maintained.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Anchor Point Movement and the Resulting Vector Art Object Deformation

Figure 3:
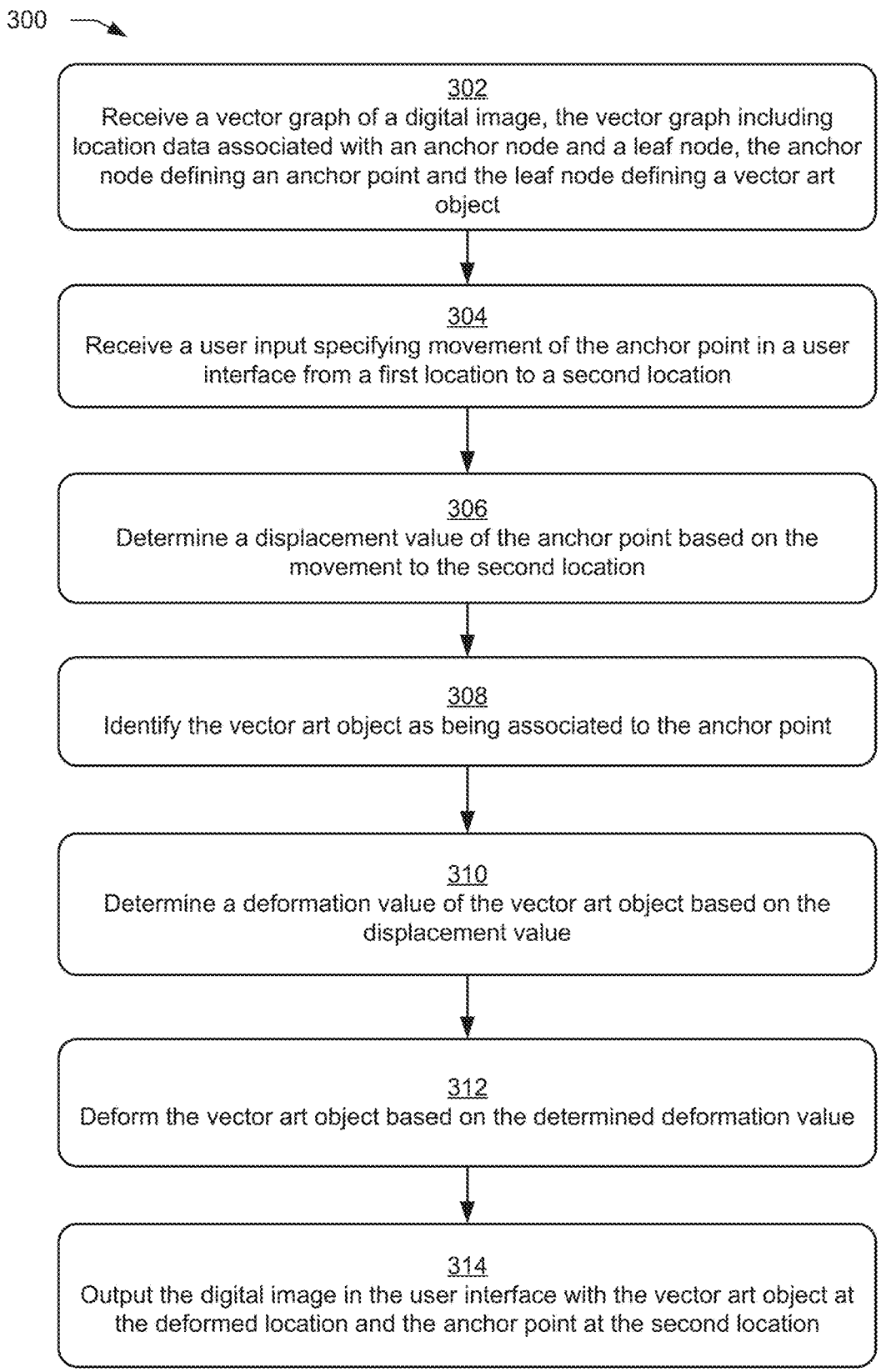
FIG. 3 is a flow diagram depicting an example procedure to create and edit digital content using the vector art rendering system described herein. The procedure includes moving an anchor point, which results in the adjustment in location of the anchor point and deformation of the vector object associated with the anchor point, both of which are then output within a user interface.

FIG. 2 depicts a system 200 in an example implementation in which operation of a vector art manager module 114 of vector art rendering system 104 is shown in greater detail. FIG. 3 depicts a procedure 300 in an example implementation of the vector art object deformation techniques described herein that is initiated by anchor point movement.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 2-15.

Vector art manager module 114, as depicted in FIG. 2, is configured to address the deficiencies present in conventional vector art rendering techniques by enabling the creation and design of vector graphics within digital images while maintaining the integrity and overall shape constraints of these images. In the illustrated example, the vector art manager module 114 includes a node position module 202 configured to receive a vector graph of a digital image that includes an anchor node 204 and a leaf node 206. The anchor node defines an anchor point and the leaf node defines a vector art object (block 302).

Figure 4:
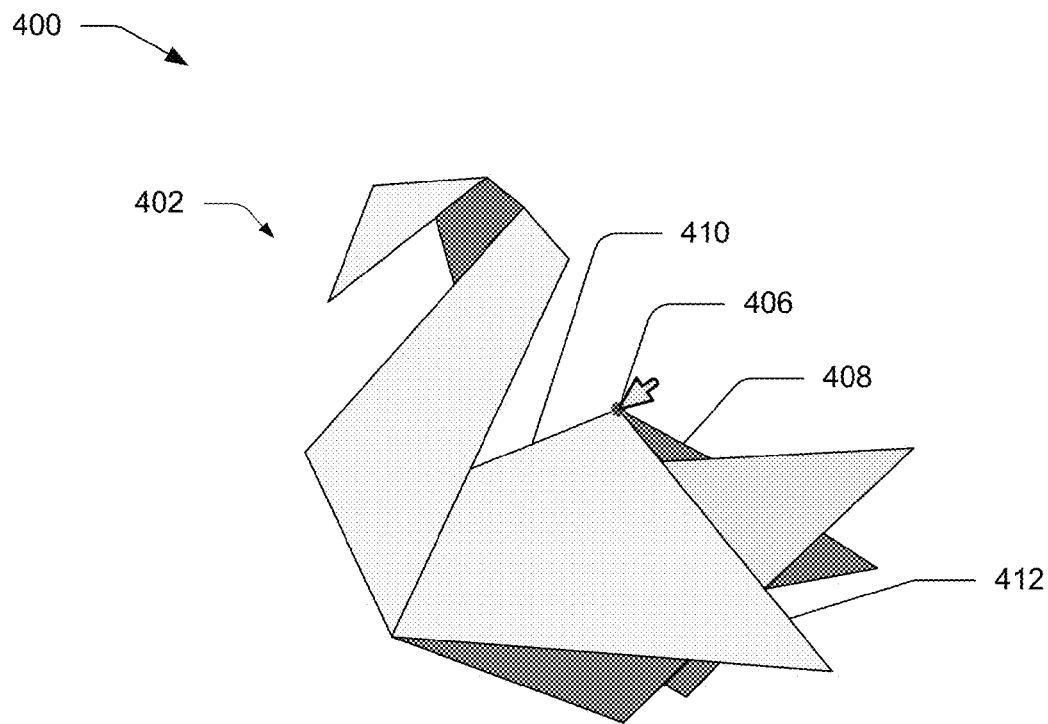
FIG. 4 depicts the deficiencies present in conventional vector art rendering systems, namely the severing of connections in digital content as a result of anchor point movement.
Figure 4:
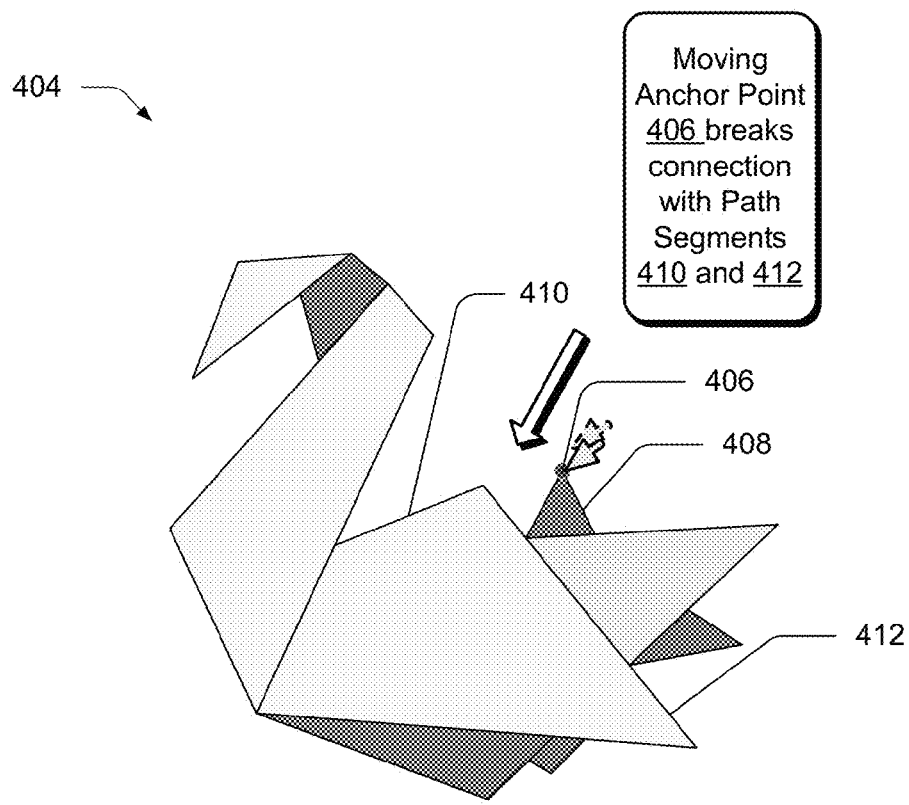
Figure 11:
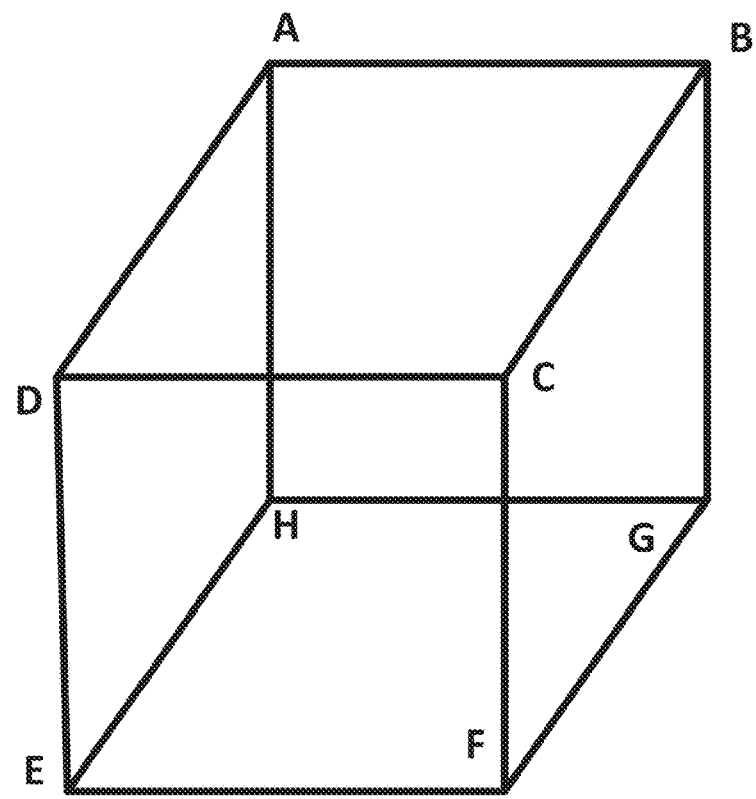
FIG. 11 depicts the rendering of digital content, i.e. a cube, with anchor points A-H, and the location of each of the anchor points and the segments connected to these points being stored in a data structure by a node position module of the vector art rendering system described here.
Figure 11:
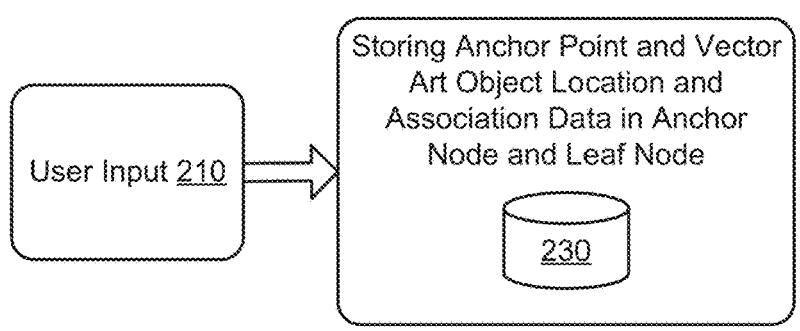
Figure 12:
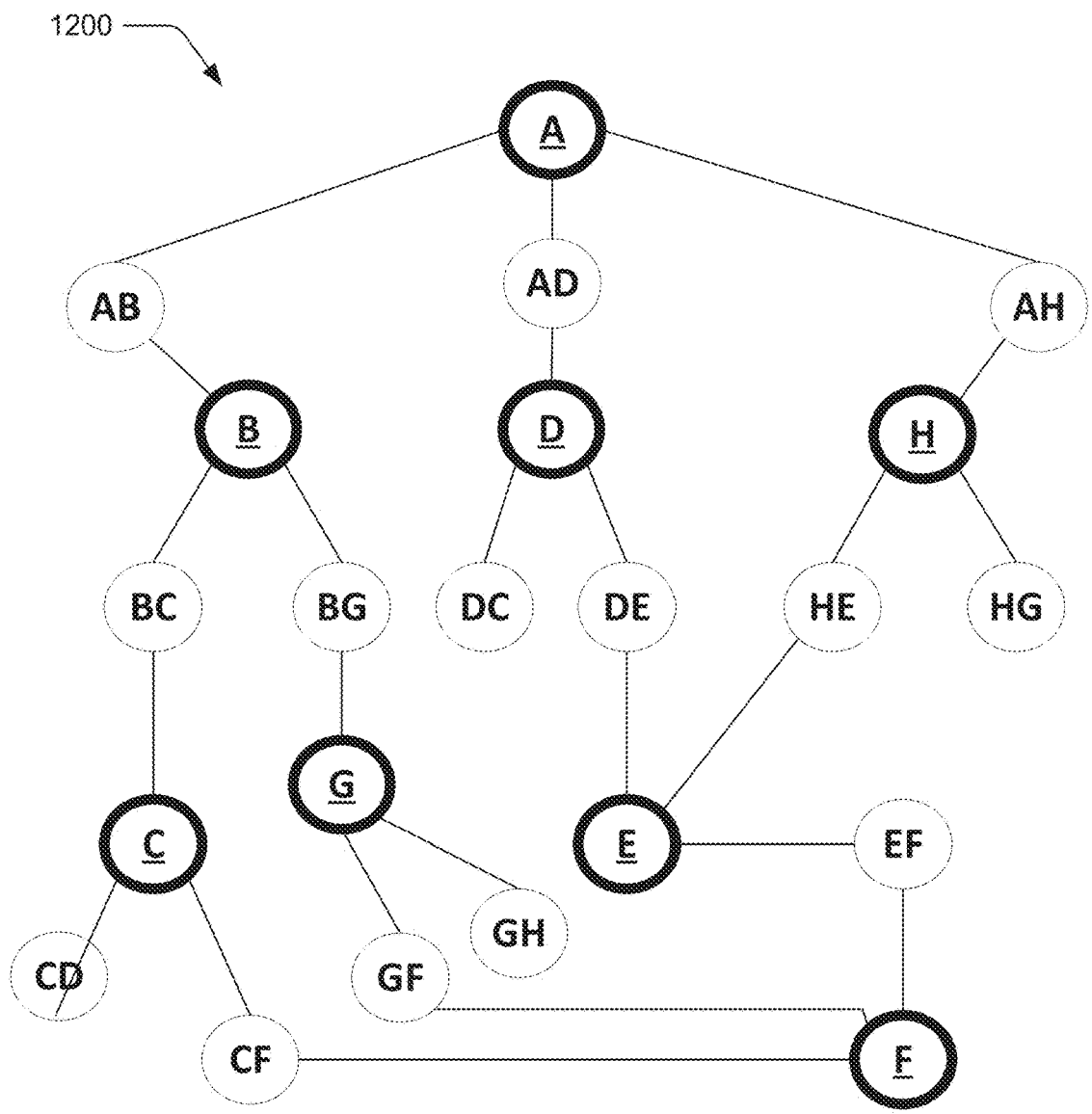
FIG. 12 depicts the vector graph of the cube displayed in FIG. 11. The anchor points are depicted as a single letter within a bolded circle, and the path segments connected to each of the anchor points are depicted within another circle and labeled based on the anchor points found at the ends of the path segment.
Figure 12:
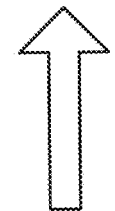

An example vector graph is depicted in FIG. 12, which displays the locational and associational relationships between the anchor points and the path segments that form the cube depicted in FIG. 11. While FIG. 11 depicts path segments connected to the anchor points, it is noted that the vector art rendering system 104 described here is configured to track, store, and update location data and associational relationships between anchor points and a variety of vector art objects, including, for example, path segments, arc segments, bezier path based objects, and complex path based objects. Prior to detailing the operation of the vector art rendering system, a discussion of FIG. 4 is instructive. FIG. 4 depicts the limitations present in conventional vector art rendering systems.

FIG. 4 depicts an example 400 of a result of user interaction with conventional vector art rendering systems and techniques. When conventional vector art rendering systems receive user inputs to move an anchor point, these systems sever the anchor point's existing connections with path segments and/or vector art objects. The interaction with a swan shaped digital image is illustrated, in part, using first and second stages 402 and 404 as applicable to FIG. 4. At first stage 402, when the system receives a user input to move anchor point 406, the anchor point's connection to path segments 410 and 412, each of which converge onto anchor point 406 from varying directions, is severed. At second stage 404, conventional vector art rendering systems are configured, as shown in this example, to maintain anchor point 406's connection only with path segment 408. Thus, these systems require users to manually scale, realign, and readjust all severed connections, thereby limiting user creativity and design efficiency.

Figure 5:
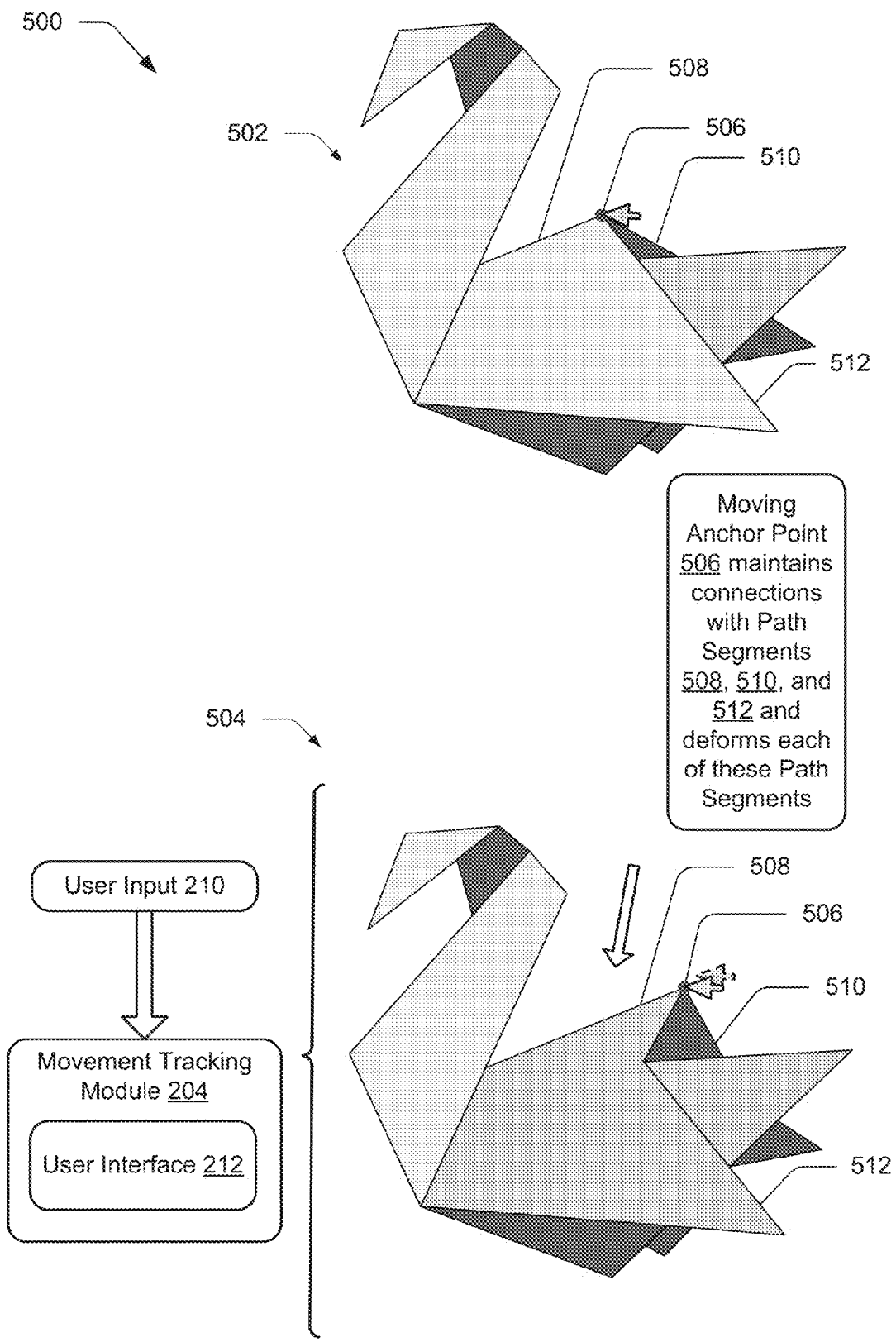
FIG. 5 depicts features of the vector art rendering system that overcomes the deficiencies of conventional techniques by receiving input to move an anchor point while maintaining the anchor point's connection with path segments and other shapes, thereby preserving the overall integrity and original shape constraints of the digital content.

FIG. 5 depicts an example 500 of a vector art rendering system 104 described herein that solves the limitations of conventional vector art rendering systems. A user's interaction with the swan shaped digital image is illustrated, in part, using first and second stages 502 and 504 as applicable to FIG. 5. At the first stage 502, node position module 202 receives a vector graph of the swan-shaped digital image, which includes anchor nodes that define anchor points and leaf nodes that define vector art objects associated with the anchor points. Specifically, the position information of anchor point 506, and of path segments 508, 510, and 512, all of which are associated with the anchor point will be stored and tacked by the node position module 202 within the vector graph (not shown).

Thereafter, at second stage 504, a user input 210 is received via a cursor control device, gestures, and so forth to move anchor point 506, depicted in the form of a red dot for illustrative purposes. The user input 210, for instance, may consist of the user placing the cursor on anchor point 506, clicking and holding the anchor point, and subsequently moving it, in user interface 212, from a first location to a second location (block 304). Showing this process in second stage 504 of FIG. 5, anchor point 506 appears to be dragged diagonally at a forty-five degree angle for a particular distance from its original location. Based on user input 210, a displacement determination module 214 determines a displacement value of anchor point (block 306). After anchor point 506 is dragged diagonally, the displacement determination module 214 calculates a displacement value based on the dragged distance. Thereafter, the node identification module 216 identifies vector art object associated with anchor point 506 (block 308). In FIG. 5, the node identification module 216 identifies path segments 508, 510 and 512, which converge on anchor point 506, extend outwards in different directions, and connect with various other shapes and path segments within the swan shaped digital image.

Next, the deformation determination module 218 calculates a vector art deformation value (block 310). In FIG. 5, after the displacement value of anchor point 506 is calculated based on its diagonal movement depicted in second stage 504, deformation determination module 218 calculates the extent, to which, the path segments 508, 510, and 512 are to be deformed. Then, deformation module 220 deforms the vector art objects associated with an anchor point based on the deformation value (block 312) In FIG. 5, the deformation module 220 deforms path segments 508, 510, and 512 based on the calculated deformation value.

Finally, digital image output module 224 outputs the digital image in user interface 212 with the anchor point at the second location and the vector art objects at a location based on the deformation (block 314). In FIG. 5, after user input 210 is received by movement tracking module 208, the digital image output module outputs the digital image such that anchor point 506 is shown to appear at a distance that is diagonally forty-five degrees away from its previous position, path segment 508 appears extended, path segment 510 appears approximately like a straight line pointing vertically upwards, and path segment 512 appears to have a sharp divergence at a particular point. The new locations of each of the anchor points and the vector art objects associated with the anchor points—anchor point 506 and path segments 508, 510, and 512—are tracked and stored under the designations of anchor nodes and leaf nodes within the vector graph (not shown).

Importantly, unlike the limitations of conventional techniques, all connections associated with anchor point 506—namely path segments 508, 510, and 512—are maintained after the anchor point is moved. And each of these vector art objects, path segments in this instance, are deformed automatically, thereby enabling users to efficiently reshape, edit, and create vector graphics without the need to manually realign, scale, and reestablish severed connections. In this way, vector art rendering system 104 described herein facilitates the adjustment and deformation of one or more objects within a digital image while preserving the original constraints and overall integrity of the image.

Figure 6:
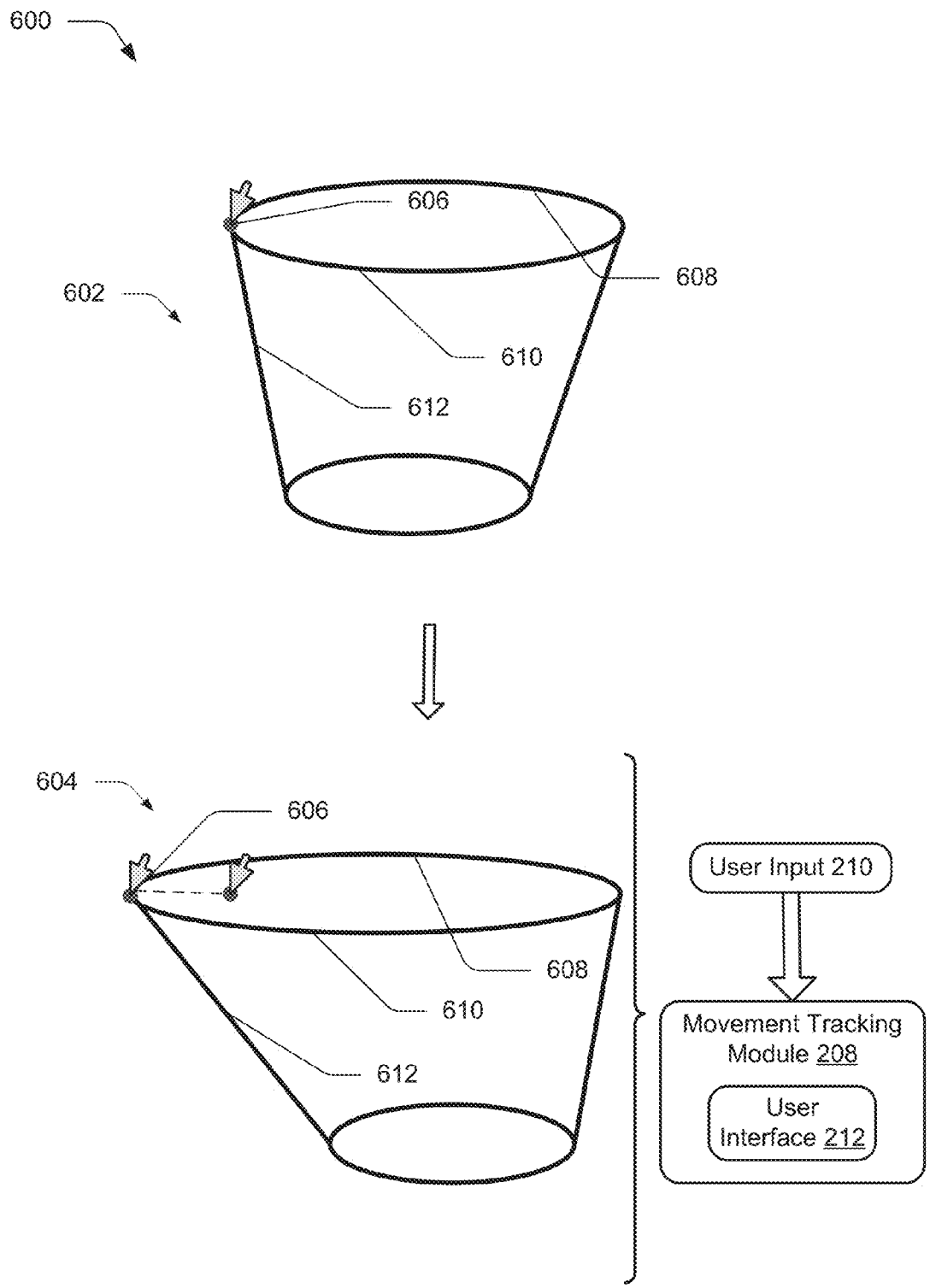
FIG. 6 depicts features of the vector art rendering system that overcomes the deficiencies of conventional techniques by receiving input to drag an anchor point with an in-bound handle and out-bound handle connected to arcs or curved segments while maintaining the overall integrity and shape constraints of the digital content.

FIG. 6 depicts another example implementation 600 in which vector manager module 114 is utilized to create, edit, and deform a cylinder shaped digital image. In operation, node position module 202 receives a vector graph of the cylinder shaped digital image. As stated above, the vector graph stores locational and associational relationships between anchor nodes, which define anchor points, and leaf nodes, which define the vector art objects. In FIG. 6, anchor point 606 is associated with three vector art objects—arc segments 608 and 610 and path segment 612. Path segment 612 protrudes downwards at an angle slightly small than 90 degrees and each of arc segments 608 and 610 form semicircles that converge on anchor point 606 from different directions.

A user's interaction with the cylinder shaped digital image is illustrated in first and second stages 602 and 604 as applicable to FIG. 6. At first stage 602, node position module 202 receives a vector graph of the cylinder shaped digital image, which includes anchor nodes that define anchor points and leaf nodes that define vector art objects associated with the anchor points. At second stage 604, similar to FIG. 5, user input 210 is received via movement tracking module 208 to move anchor point 606. As shown, the anchor point is moved for a predefined horizontal distance.

The next step involves node identification module 216 identifying the vector art objects associated with the moved anchor point—arc segments 608, 610 and path segment 612. Thereafter, deformation determination module 218 calculates a vector art deformation value based on the distance that anchor point 606 is moved and deformation module 220 performs the step of deforming arc segments 608, 610 and path segment 612 according to the calculated deformation value. Finally, digital image output module 224 outputs the anchor point at the moved location and the vector art objects at locations based on their deformation.

At second stage 604, anchor point 606 appears to have been dragged horizontally for a particular distance. Arc segments 608 and 610 appear to have been stretched from their positions displayed in first stage 602 such that the angle of curvature appears reduced. Path segment 612 appears diagonally more slanted. The new locations of the anchor point and the vector art objects associated with the anchor point are tracked and stored under the designations of anchor nodes and leaf nodes with the vector graph (not shown). And just an in the previous example, each of the connections associated with anchor point 606 are maintained even after the anchor point is moved, even for a plurality of connections. In this way, vector art rendering system 104 described herein overcomes the limitations of conventional vector art rendering systems and supports editing and design of vector graphics without manually realigning, scaling, and reestablishing severed connections.

Vector Art Object Movement and the Resulting Anchor Point Adjustment

Figure 7:
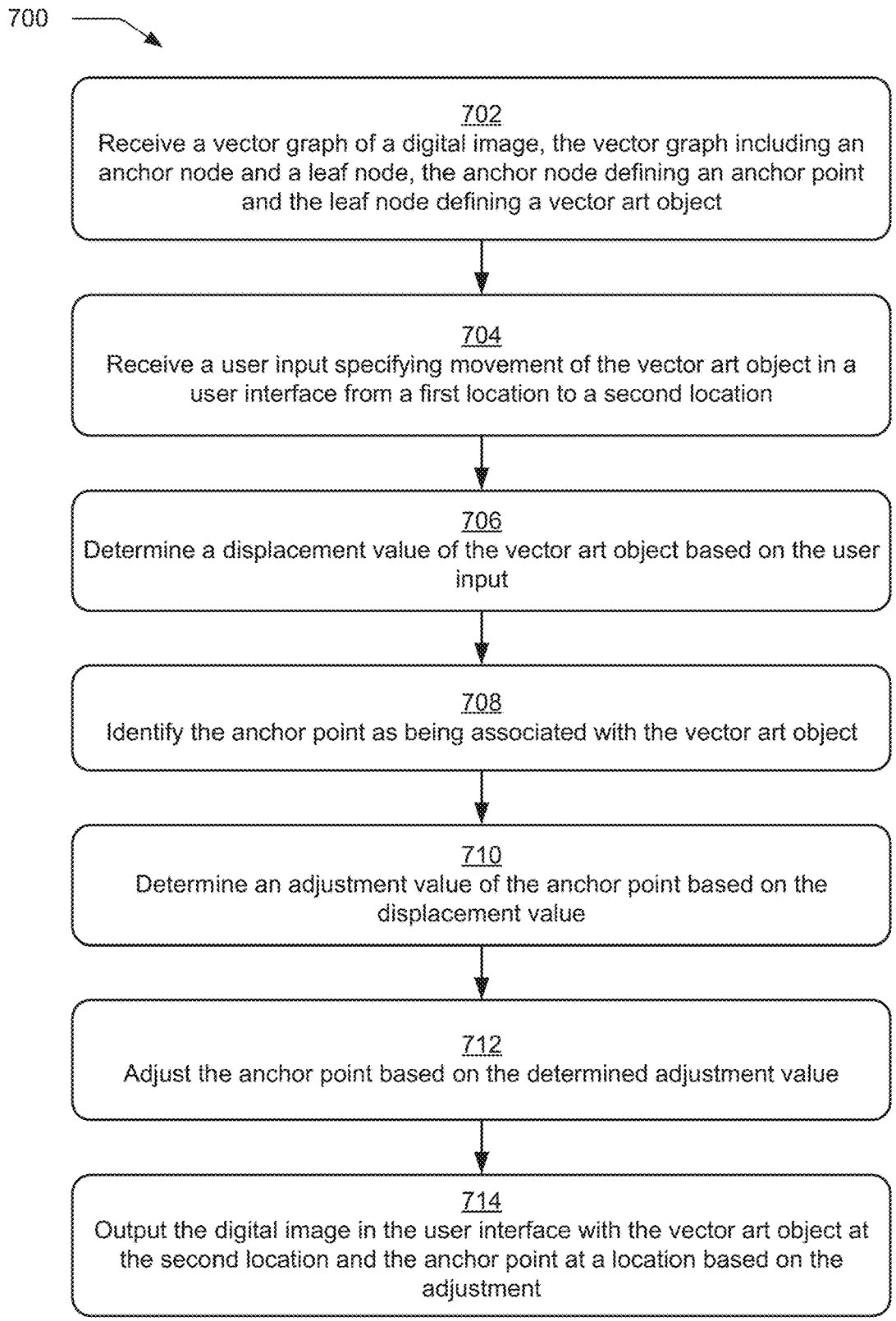
FIG. 7 is a flow diagram depicting an example procedure to create and edit digital content using the vector art rendering system. The procedure includes moving the vector art object, and adjusting the location of both the anchor point and the vector object associated with the anchor point, and outputting the moved anchor point and the deformed vector objects associated with the anchor point within a user interface.

FIG. 7 depicts a procedure 700 in an example implementation of the vector art object deformation techniques described herein initiated by vector art object movement. FIG. 3, in contrast, depicts an example implementation in which the deformation techniques are initiated by anchor point movement. The following discussion describes techniques that may be implemented utilizing the below described systems and devices.

To begin, just as in the procedure depicted in FIG. 3, the node position module 202 included in vector art manager module 114 receives a vector graph of a digital image. The received vector graph includes an anchor node that defines an anchor point and a leaf node that defines a vector art object (block 702). Prior to discussing the next steps performed by the vector art manager module 114, a discussion of FIG. 8 is instructive.

Figure 8:
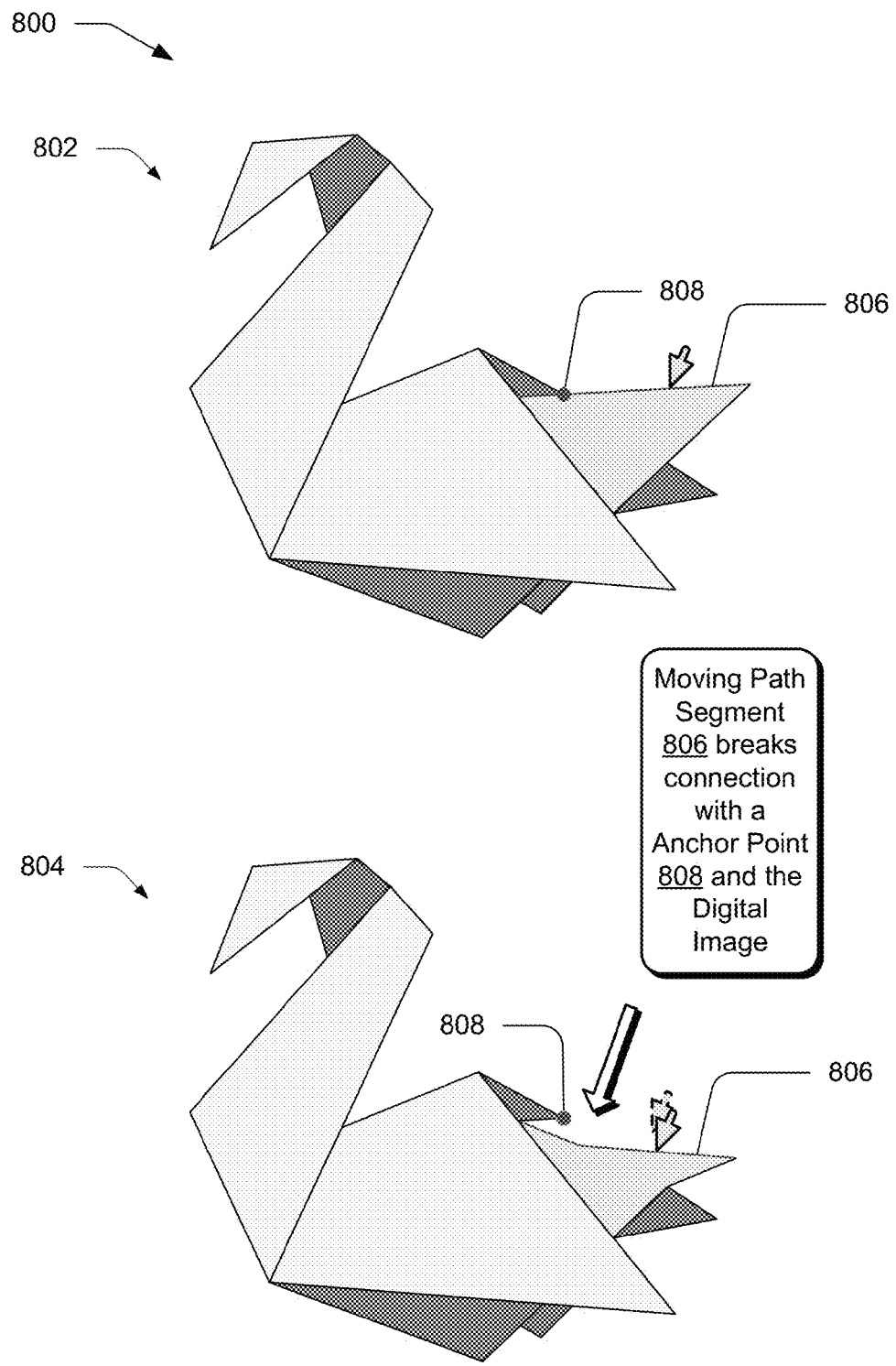
FIG. 8 depicts the deficiencies present in conventional vector art rendering systems, namely the severing of connections in digital content as a result of path segment movement.

FIG. 8 depicts the limitations present in conventional vector art rendering systems and techniques. When conventional vector art rendering systems receive user input to move a path segment (as opposed to an anchor point as depicted in FIG. 4), these systems sever the segment's connections with other path segments, vector art objects, and anchor points. A user's interaction with conventional vector art rendering systems is illustrated, in part, using first and second stages 802 and 804 as applicable to FIG. 8.

At first stage 802, when the conventional system receives a user input to move path segment 806 (i.e. vector art object), the segment's connection with anchor point 808 is severed. Consequently, these systems require users to manually scale, realign, and readjust all severed connections, thereby limiting user creativity and design efficiency.

Figure 9:
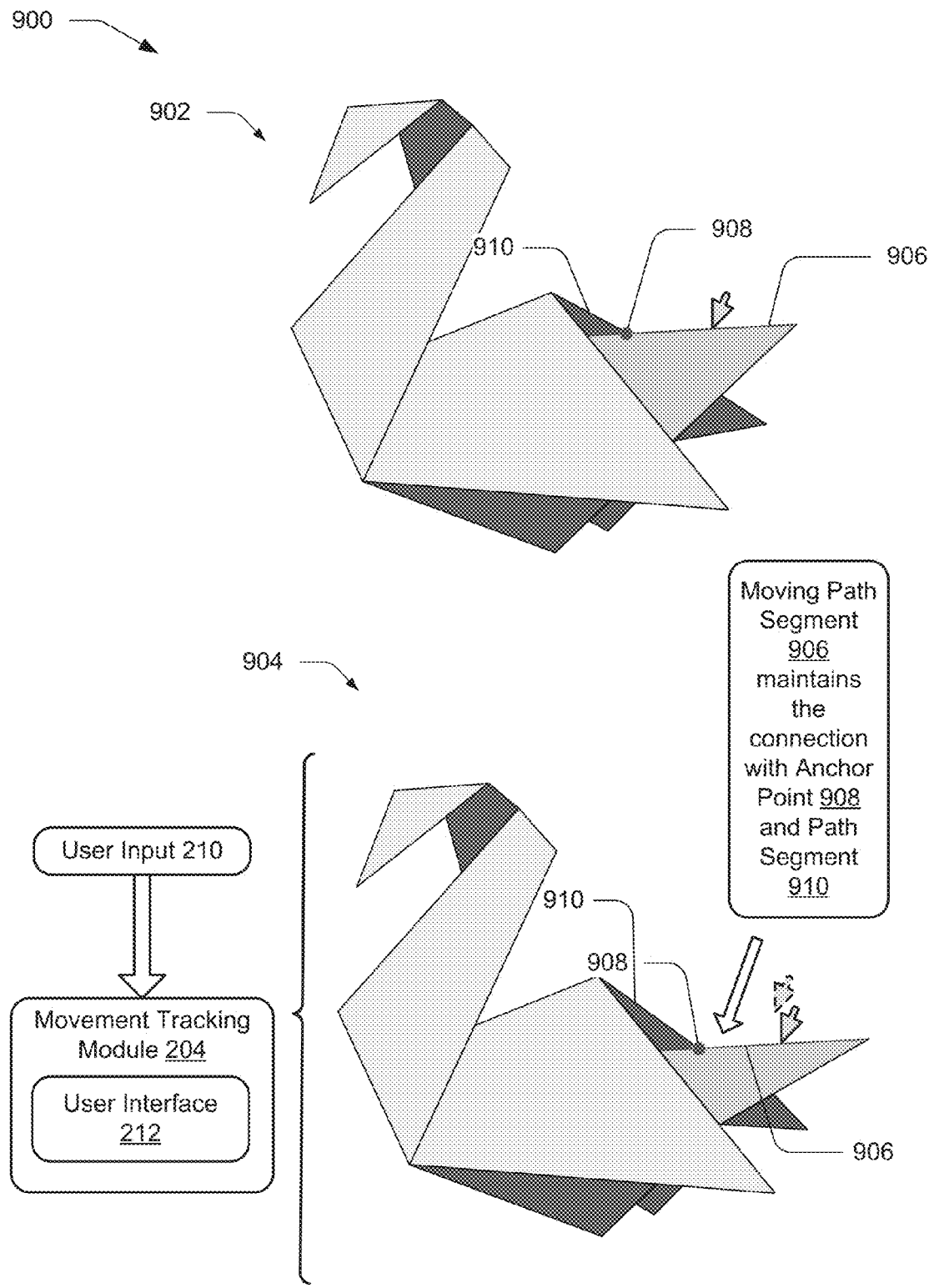
FIG. 9 depicts features of the vector art rendering system that overcomes the deficiencies of conventional techniques by receiving input to move path segments while maintaining the path segment's connection with anchor point and other shapes, thereby preserving the overall integrity of original shape constraints of the digital content.

FIG. 9 depicts the operation of vector art rendering system 104 described herein that solves the limitations of conventional vector art rendering systems. A user's interaction with the swan shaped digital image is illustrated, in part, using first and second stages 902 and 904 as applicable to FIG. 9. At the first stage 902, node position module 202 receives a vector graph of the swan-shaped digital image, which includes anchor nodes that define anchor points and leaf nodes that define vector art objects associated with the anchor points. Specifically, the location info nation of path segment 906, anchor point 908, and path segment 910 will be tracked, stored, and updated within the vector graph (not shown). While the location information of other anchor points and vector art objects associated with these points are also stored and updated in the vector graph, this example is restricted to a discussion of path segment 906, 910 and anchor point 908 for illustrative purposes.

At second stage 904, a user input 210 is received by movement tracking module 208, via interaction with user interface 212, to move path segment 906 from a first position to a second position (block 704). As illustrated, path segment 906 appears to have been dragged diagonally downwards such that the area of the triangle formed at the end of the swan shaped image appears smaller. Based on user input 210, a displacement determination module 214 calculates a displacement value of the vector art object—path segment 906 in this instance (block 706). After path segment 906 is dragged diagonally downwards for a particular distance, the displacement determination module 214 calculates a displacement value based on the dragged distance. Thereafter, the node identification module 216 identifies the anchor point as being associated with the vector art object (block 708). In this example, node identification module 216 identifies anchor point 908 as being associated with path segment 906. As depicted, anchor point appears to be on a portion of path segment 906 and is located at the intersection of path segments 906 and 910.

Next, the deformation determination module 218 calculates an anchor point adjustment value (block 710). In FIG. 9, after the displacement value of path segment 906 is calculated based on its diagonal movement depicted in second stage 904, deformation determine module 218 calculates the amount that anchor point 908 needs to be adjusted (i.e. adjustment value) based on path segment 906's diagonal movement. Then, deformation module 220 adjusts anchor point 908 in accordance with the calculated adjustment value (block 712).

Finally, digital image output module 224 outputs the digital image in user interface 212 with the vector art object at the second location and the anchor point at a location based on the adjustment (block 714). In FIG. 9, the digital image that is finally output on user interface 212, depicted in second stage 904, shows path segment 906 moved downwards for a particular distance and anchor point 908 appears to have been adjusted to a location based on the path segment's movement. Additionally, path segment 910 appears dragged a particular distance because of its association with anchor point 908. The new locations of path segments 906, 910 and anchor point 908 associated with segments 906 and 910 are tracked, updated, and stored under the designations of anchor nodes and leaf nodes by the node position module 202 in the vector graph.

In contrast with conventional techniques, each of the connections associated with path segment 906—namely the path segment's connection with anchor point 908 and path segment 910—are maintained after the path segment is moved. In this way, vector art rendering system 104 described herein facilitates the movement and adjustment of one or more distinct components within a digital image while preserving the original constraints and overall integrity of the swan-shaped image.

Figure 10:
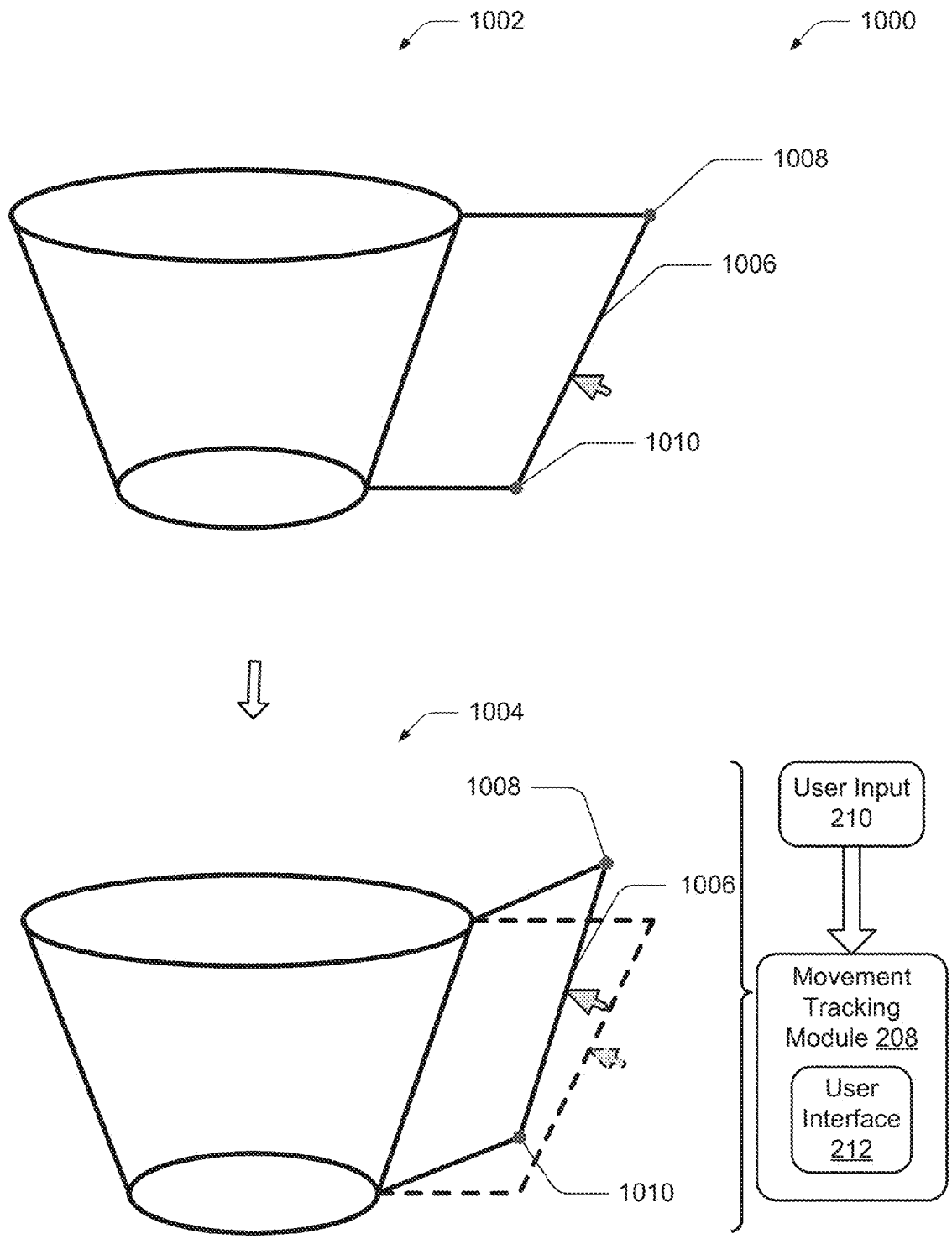
FIG. 10 depicts features of the vector art rendering system that overcomes the deficiencies of conventional techniques by receiving input to drag a path segment while maintaining the overall integrity and shape constraints of the digital content.

FIG. 10 depicts another example implementation 1000 of the vector manager module 114 utilized to create, edit, and deform a cup-shaped digital image. In operation, node position module 202 receives a vector graph of the cup-shaped digital image. The vector graph stores locational and associational relationships between anchor nodes that define anchor points, and leaf nodes that define vector art objects. As illustrated, path segment 1006 is associated with anchor points 1008 and 1010—each of which are located at the ends of the segment. A result of a user's interaction with path segment 1006 is illustrated in first and second stages 1002 and 1004 as applicable to FIG. 10. At first stage 1002, node position module 202 receives a vector graph of the cup-shaped digital image. At second stage 1004, as previously discussed, user input 210 is received via movement tracking module 208 to move path segment 1006. The path segment 1006 appears to be dragged at an angle such that the segment's proximity to the edge of the cylinder portion of the cup appears reduced.

The node identification module 216 then identifies the anchor points associated with the moved vector art object—anchor points 1008 and 1010 in this instance. Thereafter, the deformation determination module 218 calculates an adjustment value of the anchor point based on the movement of the vector art object and the deformation module 220 adjusts the anchor point based on the calculated adjustment value. Finally, the digital image output module 224 outputs the vector art object at the second location and the anchor point at a location based on the adjustment.

At the second stage 1004, path segment 1006 appears to have been dragged closer to the cylinder portion of the cup and anchor points 1008 and 1010 appear to have traced the movement of path segment 1006. As in previous examples, the locations of path segment 1006 and anchor points 1008 and 1010 associated with the path segments are tracked and stored under the designations of anchor nodes and leaf nodes within the vector graph. Each of the connections associated with path segment 1006, namely anchor points 1008 and 1010, are maintained even after the path segment is moved. In this way, vector art rendering system 104 described herein overcomes the limitations of conventional vector art rendering systems and enables users to edit and design vector graphics without manually realigning, scaling, and reestablishing severed connections.

Automatically Associating Vector Art Objects to Anchor Points

Figure 13A:
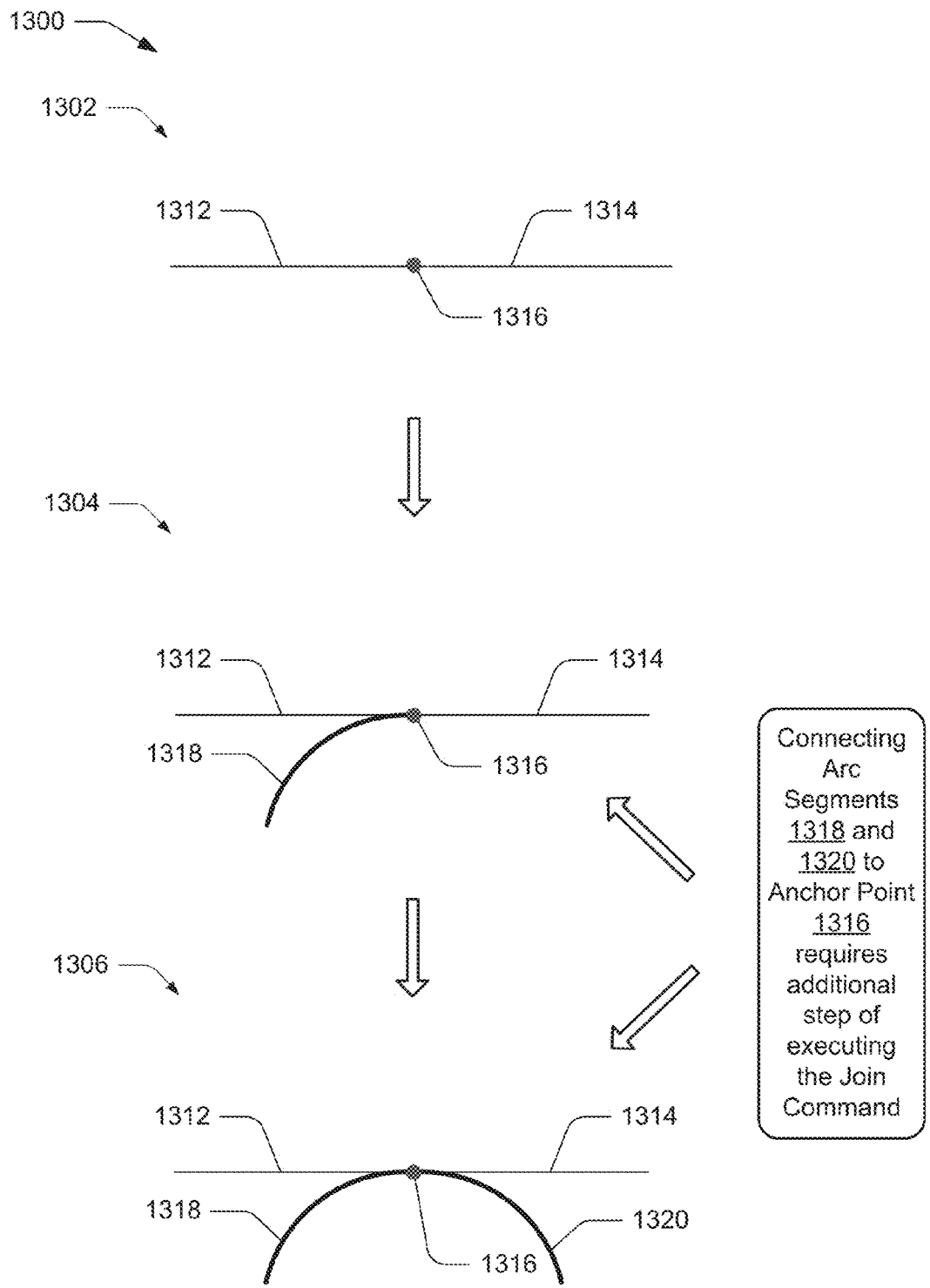
FIG. 13A depicts an anchor point with an in-bound handle and out-bound handle in the form of dotted lines extending outwards from the anchor point in diametrically opposite directions. The in-bound and out-bound handle are each shown to trace the path of a curve segment converging on the anchor point from different directions.
Figure 13B:
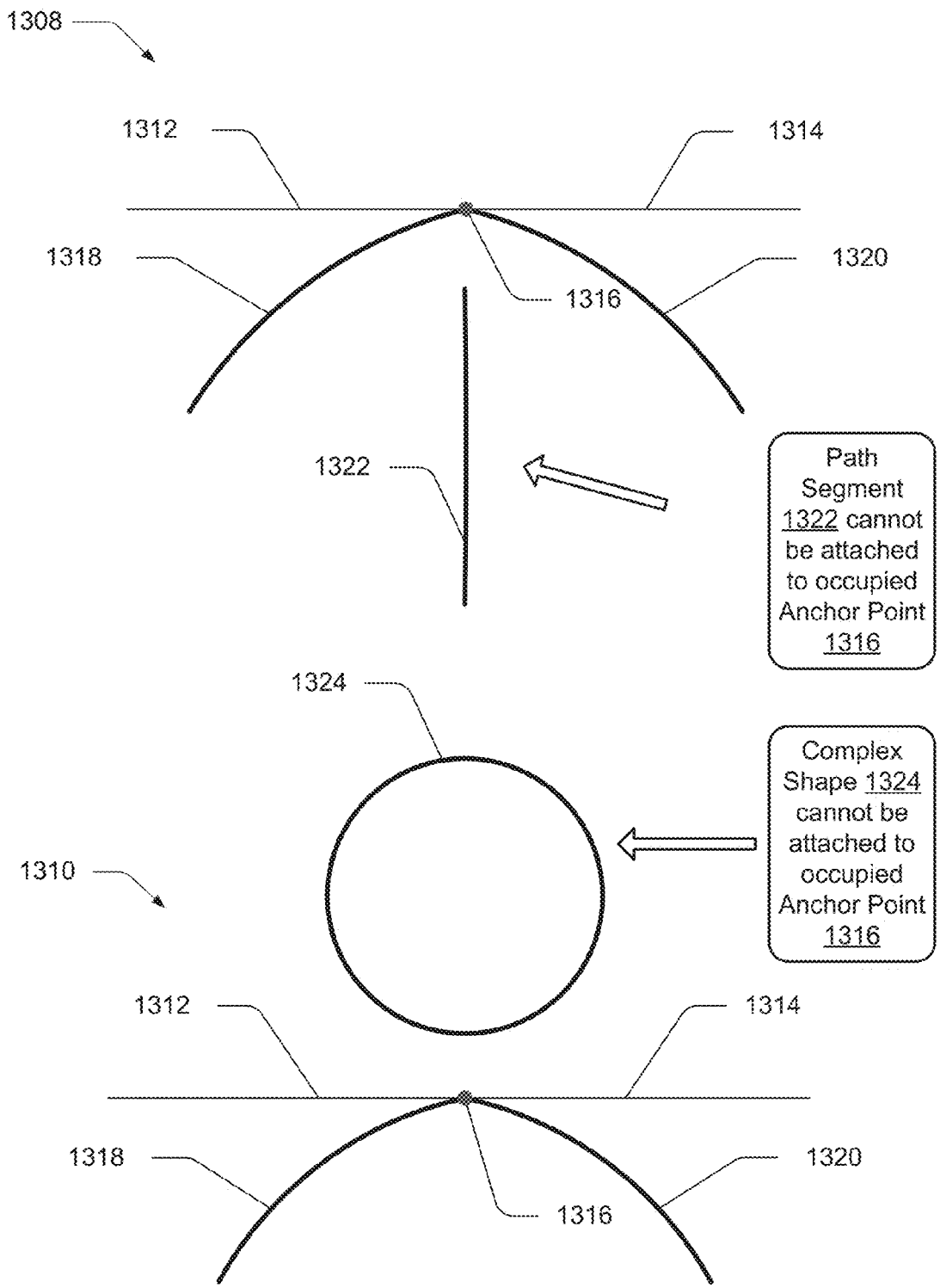
FIG. 13B depicts the deficiencies present in conventional techniques, namely the inability of conventional vector art rendering systems to connect a path segment or a complex shape to an anchor point that has its in-bound handle and out-bound handle connected to arcs or path segments.

FIGS. 13A and 13B depict further limitations of conventional vector art rendering systems. When a user attempts to associate a path segment, arc segment, or another vector art object to an anchor point that is already associated with two vector art objects, conventional vector art rendering systems reject the attempted association. Conventional vector art rendering system only permit an anchor point to be associated with two path segments or arc segments at any given time. Additionally, another limitation in conventional rendering systems is that a user is required to execute a "join command"—an additional step after aligning and placing the path or arc segment on an anchor point. These problems are detailed in FIGS. 13A and 13B.

In FIG. 13A, the limitation in conventional vector art rendering systems of requiring the join command to arc segments to anchor points is depicted. A user's interaction with an anchor point using conventional vector art rendering systems is illustrated in first, second, and third stages 1302, 1304, and 1306 as applicable to FIG. 13A. Specifically, first stage 1302 depicts anchor point 1316 as including an in-bound handle 1312 and out-bound handle 1314—lines converging on anchor point 1316 from different directions. Second and third stages 1304 and 1306 depict a user connecting arc segments 1318 and 1320 with anchor point 1316 by dragging arc segment endpoints, via a cursor for example (not shown), onto the anchor point. Thereafter, the final joining of arc segments to the anchor point requires execution of a join command. As such, FIG. 13A depicts the limitation in conventional techniques of requiring users to connect arc segments to an anchor point by performing an additional step beyond merely placing the arc segment on top of the anchor point.

In FIG. 13B, the inability of conventional vector art rendering systems to associate more than two path segments with an anchor point at any given time is depicted. Additionally, conventional vector art rendering system altogether fail to associate a vector art object with a complex shape or complex path to an anchor point. These limitations are depicted in third and fourth stages 1308 and 1310. At third stage 1308, conventional vector art rendering systems are shown as failing to associate segment 1322 with anchor point 1316, which has each of its in-bound handle and out-bound handle currently associated with arc segments 1318 and 1320. At fourth stage 1310, complex shape 1324 simply cannot be connected to anchor point 1316.

Figure 14:
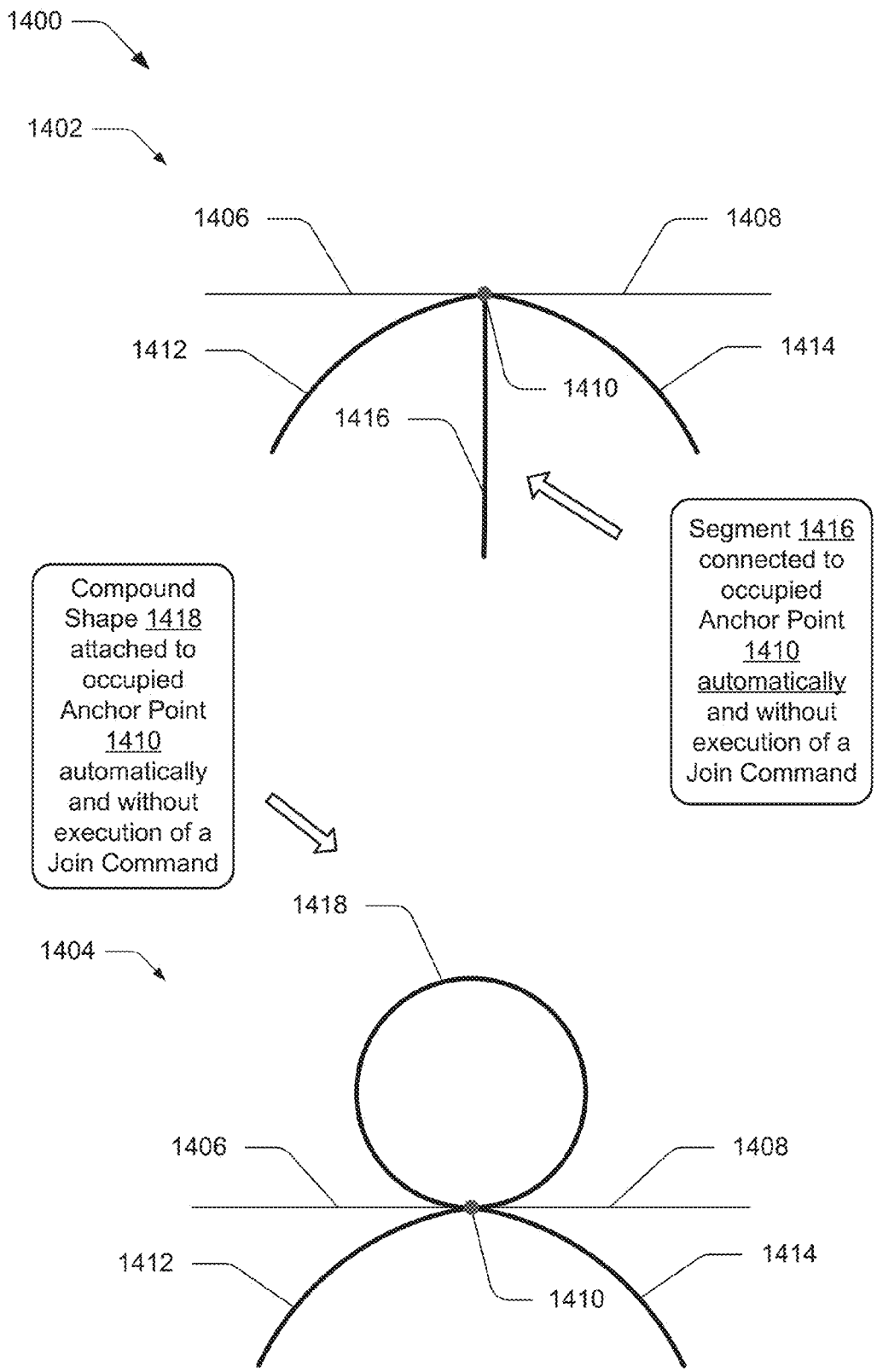
FIG. 14 depicts the features of the vector art rendering system that overcomes the deficiencies of conventional techniques by enabling content creators to connect a path segment or a complex shape to an anchor point that has its in-bound handle and out-bound handle connected to e.g., a path segment.

FIG. 14 depicts an example 1400 of operation of vector art rendering system 104 described herein that addresses and solves these limitations in conventional vector art rendering systems. A user's interaction, via vector art manager module 114, with anchor point 1410 that has both its in-bound handle and out-bound handle associated with arc segments 1412 and 1414 is shown. The interaction is illustrated in first and second stages 1402 and 1404 as applicable to FIG. 14. At first stage 1402, movement tracking module 208 of vector art manager module 114 may receive a user input that moves segment 1416 near anchor point 1410. When segment 1416 is placed in such close proximity that the segment overlaps the anchor point, vector art manager module 114 automatically connects the segment with the anchor point. Thereafter, node position module 202 updates the anchor node that defines anchor point 1410 to include an association with three vector art objects—arc segments 1412 and 1414 and segment 1416. In this way, vector art rendering system 104 overcomes the limitations in conventional rendering systems—namely enabling users to associate more than two objects with an anchor point at any given time. Moreover, unlike conventional rendering systems, the process of associating the additional object does not require execution of the additional step of the "join" command. The association is automatic.

At second stage 1404, movement tracking module 208 of vector art manager module 114 may receive a user input that moves a compound shape 1418 near anchor point 1410. When compound shape 1418 is placed in such close proximity that the shape overlaps the anchor point, vector art manager module 114 automatically connects the shape to the anchor point. Thereafter, node position module 202 updates the anchor node that defines anchor point 1410 to include an association with three vector art objects—arc segments 1412 and 1414 and compound shape 1418. In this way, vector art rendering system 104 overcomes all of the above discussed limitations in conventional rendering systems. First, the vector art rendering system 104 enables users to associate an anchor point with more than two objects at any given time.

Second, the vector art rendering system 104 enables users to connect a complex shape to an anchor point—a feature that is entirely absent in conventional rendering systems. Third, the vector art rendering system 104 enables users to connect the complex shape to an anchor point without requiring the execution of an additional step—the join command.

Example System and Device

Figure 15:
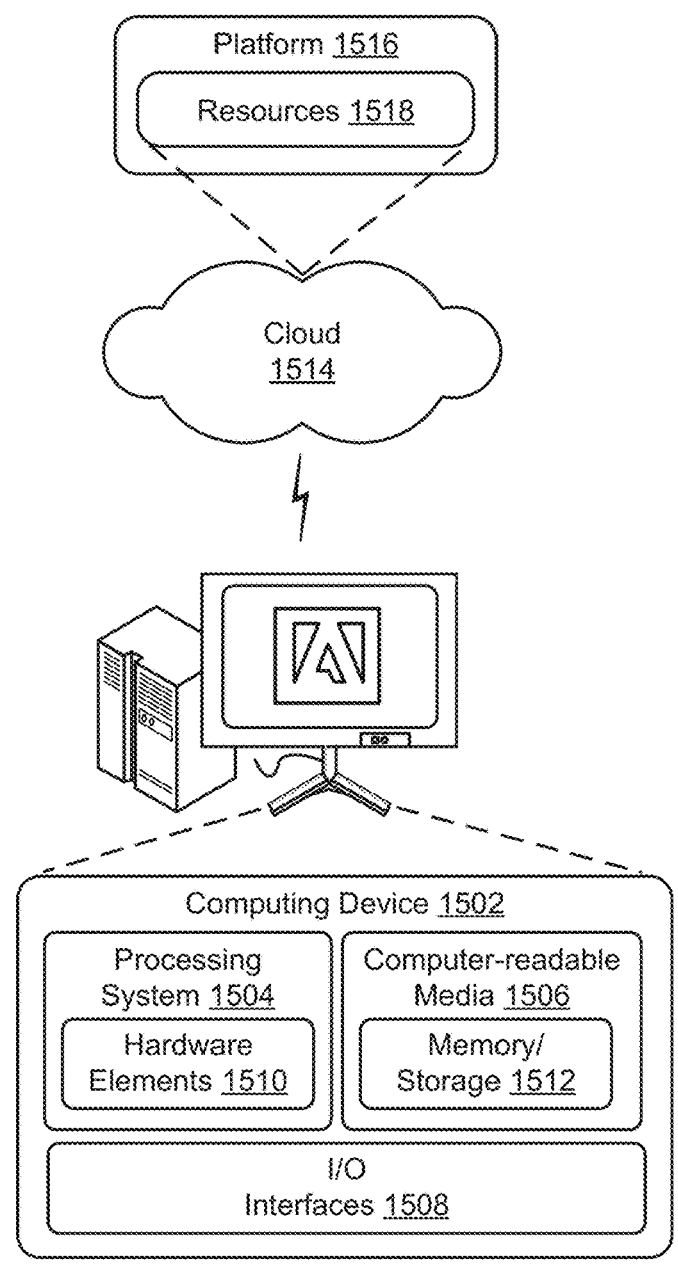
FIG. 15 illustrates an example system including various components of an example device that can be implemented as any type of computing device as described and/or utilized with references to FIGS. 1-10 to implement examples of the techniques described herein.

FIG. 15 illustrates an example system generally at 1500 that includes an example computing device 1502 that is representative of one or more computing systems and/or devices that may implement the various techniques described herein. This is illustrated through the inclusion of vector art rendering system 104. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 15112 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

CONCLUSION

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

The invention claimed is:

1. In a digital medium vector art rendering environment, a method implemented by a computing device, the method comprising:
    receiving, by the computing device, a vector graph of a digital image, the vector graph including an anchor node and a leaf node, the anchor node defining an anchor point and the leaf node defining a vector art object connected to the anchor point, the anchor point configured to control curvature of the vector art object;
    displaying, by the computing device, the digital image in a user interface;
    receiving, by the computing device, a user input specifying movement of the anchor point in the user interface from a first location to a second location;
    determining, by the computing device, a displacement value of the anchor point based on the user input;
    identifying, by the computing device responsive to the receiving of the user input, the vector art object as being associated with the anchor point based on the vector graph;
    determining, by the computing device responsive to the identifying, a deformation value of the vector art object based on the displacement value;
    deforming, by the computing device, the vector art object based on the determined deformation value; and
    outputting, by the computing device, the digital image in the user interface with the vector art object at a location based on the deformation and the anchor point at the second location.

2. The method as described in claim 1, further comprising updating, by the computing device, location data associated with the anchor node and the leaf node in the vector graph based on the displacement value of the anchor point and the deformation value of the vector art object.

3. The method as described in claim 1, wherein the anchor point includes an in-bound handle and an out-bound handle, and the vector art object is at least one of a Bezier curve, path segment, or a complex shape.

4. The method as described in claim 1, further comprising
    receiving a second user input to associate a second vector art object with the anchor point;
    generating, by the computing device, a second leaf node with location data of the second vector art object associated with the anchor point; and
    updating, by the computing device, the vector graph to include the second leaf node.

5. The method as described in claim 4, wherein the vector art object is associated with an in-bound handle of the anchor point and the second vector art object is associated with an out-bound handle of the anchor point.

6. The method as described in claim 1, further comprising updating the vector graph as maintaining the association of the anchor node defining the anchor point at the second location with the leaf node defining the vector art object at the location based on the deformation.

7. The method as described in claim 1, further including:
    receiving, by the computing device, a user input to associate a second vector art object with the anchor point;
    generating, by the computing device, a leaf node with location data of the second vector art object associated with the anchor point; and
    updating, by the computing device, the vector graph to include the generated leaf node.

8. The method as described in claim 7, wherein the updating includes associating by the computing device automatically and without user intervention, the second vector art object to the anchor point.

9. In a digital medium vector art rendering environment, a method implemented by a computing device, the method comprising:

receiving, by the computing device, a vector graph of a digital image, the vector graph including anchor node and a leaf node, the anchor node defining an anchor point and the leaf node defining a vector art object;

displaying, by the computing device, the digital image in a user interface;

receiving, by the computing device, a user input specifying movement of the vector art object in the user interface from a first location to a second location;

determining, by the computing device, a displacement value of the vector art object based on the user input;

identifying, by the computing device, the anchor point as being associated with the vector art object based on the vector graph;

determining, by the computing device responsive to the identifying, an adjustment value of the anchor point based on the displacement value;

adjusting, by the computing device, the anchor point based on the determined adjustment value; and outputting, by the computing device, the digital image in the user interface as having the vector art object at the second location and the anchor point at a location based on the adjustment.

10. The method as described in claim 8, further comprising updating, by the computing device, location data associated with each of the anchor node and the leaf node in the vector graph based on the displacement value of the vector art object and the adjustment value of the anchor point.

11. The method as described in claim 8, wherein the anchor point includes an in-bound handle and an out-bound handle, and the vector art object is at least one of a Bezier curve, path segment, or a complex shape.

12. The method as described in claim 8, further comprising:
receiving a second user input to associate a second vector art object with the anchor point;
generating a second leaf node with location data of the second vector art object associated with the anchor point; and
updating, by the computing device, the vector graph to include the second leaf node.

13. The method as described in claim 12, wherein the vector art object is associated with an in-bound handle of the anchor point and the second vector art object is associated with an out-bound handle of the anchor point.

14. The method as described in claim 8, further comprising updating the vector graph as maintaining the association of the anchor node defining the anchor point at the location based on the adjustment with the leaf node defining the vector art object at the second location.

15. The method as described in claim 8, further comprising:
receiving, by the computing device, a user input associating a second vector art object with the anchor point;
generating, by the computing device, a leaf node with location data of the second vector art object associated with the anchor point; and
updating, by the computing device, the vector graph to include the generated leaf node with the location data of the second vector art object.

16. The method as described in claim 15, wherein the updating includes associating, automatically and without user intervention, the second vector art object to the anchor point in the vector graph.

17. In a digital medium vector art element rendering environment, a system comprising:
a node position module implemented at least partially in hardware of a computing device to receive a vector graph of a digital image, the vector graph including an anchor node and a leaf node, the anchor node defining an anchor point and the leaf node defining a vector art object, the anchor point configured to control curvature of the vector art object;
a movement tracking module implemented at least partially in hardware of the computing device to receive a user input specifying movement of the anchor point from a first location to a second location;
a displacement determination module implemented at least partially in hardware of the computing device to determine a displacement value of the anchor point based on the user input;
a node identification module implemented at least partially in hardware of the computing device to identify the vector art object as being associated with the anchor point based on the vector graph;
a deformation determination module implemented at least partially in hardware of the computing device to determine a deformation value of the vector art object based on the displacement value;
a deformation module implemented at least partially in hardware of the computing device to deform the first vector art object based on the determined deformation value; and
a digital image output module implemented at least partially in hardware of the computing device to output the digital image in the user interface with the anchor point at the second location and the vector art object at a location based on the deformation.

18. The system as described in claim 17, wherein the node position module is further configured to update location data associated with the anchor node and the leaf node in the vector graph based on the displacement value of the anchor point and the deformation value of the vector art object.

19. The system as described in claim 17, wherein:
the movement tracking module is configured to receive a second input to associate a second vector object with the anchor point; and
the node position module generates a second leaf node with location data of the second vector art object associated with the anchor point, and is configured to update the vector graph to include the second leaf node.

20. The system as described in claim 19, wherein the movement tracking module receives a third input to associate a third vector object with the anchor point.

* * * * *